(12) United States Patent
Kikin-Gil et al.

(10) Patent No.: US 8,402,380 B2
(45) Date of Patent: Mar. 19, 2013

(54) EVENT HIGHLIGHTING AND DIFFERENTIATION VIEW

(75) Inventors: Erez Kikin-Gil, Mountain View, CA (US); Omar H. Shahine, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 647 days.

(21) Appl. No.: 11/742,324

(22) Filed: Apr. 30, 2007

(65) Prior Publication Data

US 2008/0270914 A1 Oct. 30, 2008

(51) Int. Cl.
*G06F 3/048* (2006.01)

(52) U.S. Cl. ......................... 715/764; 715/963

(58) Field of Classification Search .................. 715/963, 715/764
See application file for complete search history.

(56) References Cited

U.S. PATENT DOCUMENTS

| | | | | |
|---|---|---|---|---|
| 5,874,965 | A * | 2/1999 | Takai et al. | 345/667 |
| 6,012,037 | A * | 1/2000 | Yoshikawa | 705/7.24 |
| 6,108,640 | A | 8/2000 | Slotznick | |
| 6,186,553 | B1 | 2/2001 | Phillips et al. | |
| 7,103,559 | B2 | 9/2006 | Worthington | |
| 7,496,385 | B2 * | 2/2009 | Gruen et al. | 455/566 |
| 2002/0002558 | A1 * | 1/2002 | Krause | 707/104.1 |
| 2002/0131565 | A1 | 9/2002 | Scheuring et al. | |
| 2003/0154480 | A1 | 8/2003 | Goldthwaite et al. | |
| 2004/0122681 | A1 | 6/2004 | Ruvolo et al. | |
| 2005/0108074 | A1 * | 5/2005 | Bloechl et al. | 705/8 |
| 2006/0248109 | A1 | 11/2006 | Racovolis | |
| 2006/0265660 | A1 | 11/2006 | Hullot et al. | |
| 2007/0008321 | A1 | 1/2007 | Gallagher et al. | |
| 2007/0061712 | A1 * | 3/2007 | Bodin et al. | 715/523 |
| 2007/0210155 | A1 * | 9/2007 | Swartz et al. | 235/383 |
| 2007/0219875 | A1 * | 9/2007 | Toulotte | 705/26 |
| 2007/0250784 | A1 * | 10/2007 | Riley et al. | 715/764 |

FOREIGN PATENT DOCUMENTS

| | | |
|---|---|---|
| WO | 2004061814 A1 | 7/2004 |
| WO | 2005122112 A1 | 12/2005 |

OTHER PUBLICATIONS

Secure Reminder 7.1 http://www.surfpack.com/software/birthday/.
Anniversaries Reminder 3.21 http://www.freedownloadmanager.org/downloads/Anniversaries_Reminder_41102_p/.

* cited by examiner

*Primary Examiner* — Sara England
(74) *Attorney, Agent, or Firm* — Vierra Magen Marcus LLP

(57) ABSTRACT

A calendar application is disclosed for providing special occasion event highlighting and differentiation. The calendar application program according to the present system provides a special occasion interface which presents a high level view of all significant events for a given time period. The special occasion interface includes a plurality of special occasion event objects which can be dragged and positioned on a grid to represent special occasions of emotional or other significance to the user.

11 Claims, 11 Drawing Sheets

EVENT HIGHLIGHTING AND DIFFERENTIATION VIEW

BACKGROUND

Software application programs commonly referred to as personal information managers, or PIMs, have become extremely popular as a tool for organizing, tracking and managing personal information. One aspect of a PIM is a calendar application program which provides a user interface including a graphical representation of a calendar. The user may select to display a day, week, month, etc. Using the calendar interface, a user may record appointments, events and other information. Calendar application programs also provide automatic notifications and reminders about upcoming appointments and events. Calendar application programs typically communicate and exchange information with other PIM application programs, such as for example email and contact application programs, as well as other datastores.

Events typically are displayed on conventional calendar interfaces at their appointed date as typewritten words, and may possibly be displayed within a graphical box having a background which may be the same or different than the background of the calendar interface. One shortcoming to conventional calendar applications is that they provide little or no ability for a user to differentiate saved events with respect to the relative importance of the events. For example, a parent's birthday may be a more important event than a scheduled visit from a television repairman. However, a saved event relating to the television repairman visit is not differentiated from the saved event relating to the parent's birthday with respect to the importance of those events. Both of those events are displayed on the calendar interface in the same way.

Moreover, while conventional calendar application programs provide pop-up reminders or the like a few days in advance, these reminders are not optimized for planning around special occasions, such as family and friend birthdays. It would be advantageous to provide an interface in which special occasions occurring for example a month, a few months or even a year away are clearly shown to allow the user ample time to plan and prepare for the occasion.

SUMMARY

The present technology, roughly described, pertains to a calendar application program providing special occasion event highlighting and differentiation. The calendar application program according to the present system provides a special occasion interface which presents a high level view of all significant events for a given time period. The special occasion interface includes a plurality of special occasion event objects which can be dragged and positioned on a grid to represent special occasions of emotional or other significance to the user. Special occasion event objects include personal event objects used to represent special occasions for people, such as birthdays, anniversaries, etc. Special occasion event objects also include festivity event objects used to represent festivities, such as for example holidays.

In operation, once a user selects the special occasion interface, the interface is presented to the user and the user is given the option to add special occasion event objects to the interface. Special occasion event objects may be positioned at a given x, y coordinate on the grid based on the date of the event and a defined significance weighting associated with a given object. The date assigned to an event object may determine its location along the x-axis of the grid, and the significance weighting may determine its location along the y-axis of the grid. In embodiments, the higher the significance weighting, the more important the occasion is to the user and the higher it is placed on the grid.

In addition to positioning an event object on the grid, the user may associate an identity with the object (i.e., a particular person or festivity), as well as additional information such as planning for the event. Once the special occasion event object is created, it may be stored along with any data associated with the event object.

By using the special occasion interface, a user may quickly and easily get an overview of all significant occasions the user has in the coming weeks, months, year or other time period. Thus, as opposed to the conventional 5 day reminder provided on conventional calendar applications, a user may know at a glance and far in advance what special occasions are coming up and have plenty of time to plan for them.

The calendar application may be implemented as a client application or a network-based application. A client calendar application can store user calendar data locally on the client device. In this case, event objects associated with different time periods may be added, changed and removed from the local client device as a user configures his or her calendar. A network-based calendar application may save user calendar data remotely, using a calendar application or browser application on a client device which can access a remote server over a network. When implemented using a browser application, the application may access a web service provided by one or more web servers and/or related devices.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1:
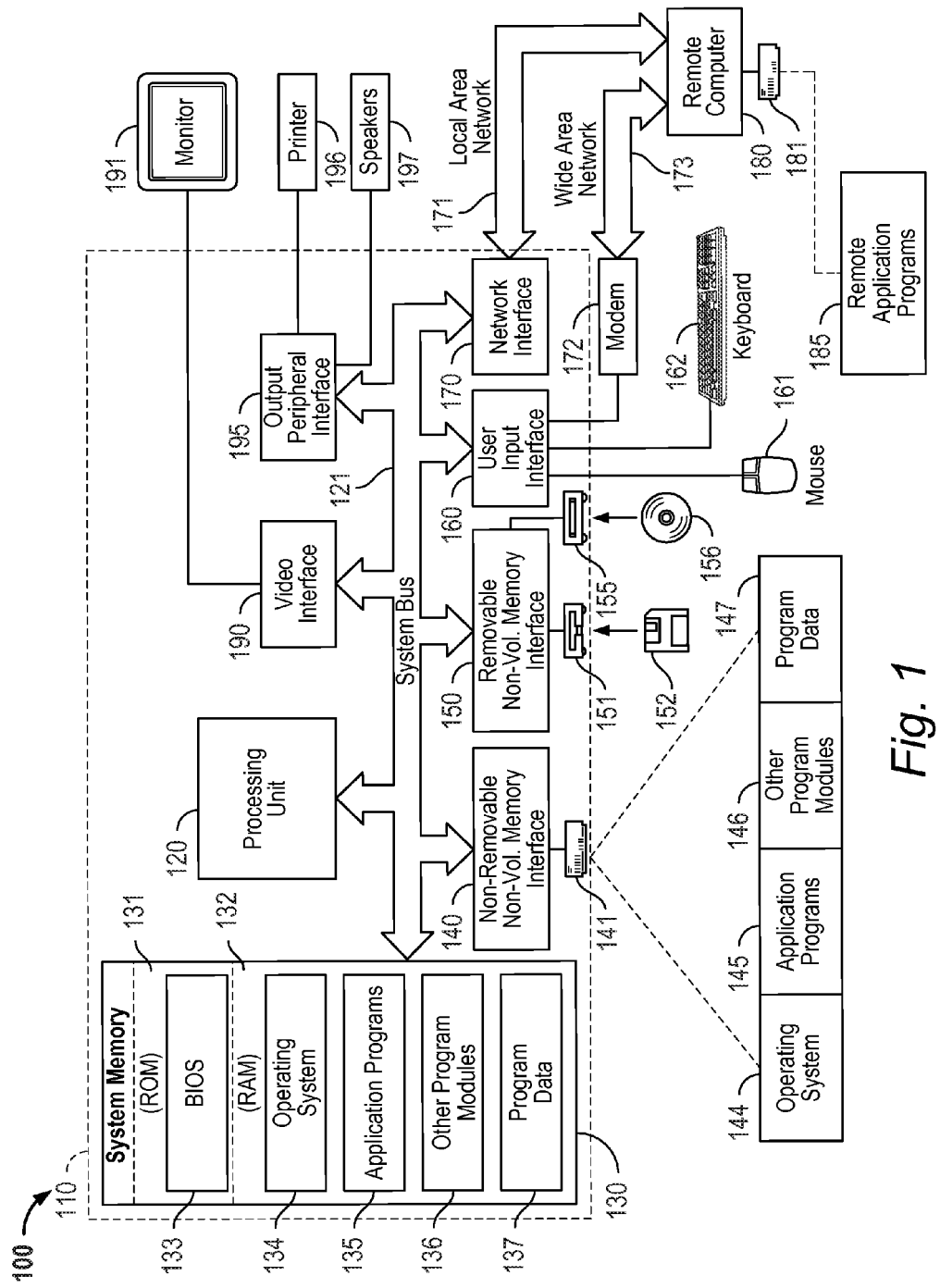
FIG. 1 is a block diagram of a computing system environment capable of executing the calendar application program according to the present system.

The present system will now be described with reference to FIGS. 1 through 11, which in general relate to a calendar application program providing special occasion event highlighting and differentiation based on user-defined preferences. The application program allows a user to manage events during time periods of one or more days, weeks or months. FIG. 1 illustrates an example of a suitable general computing system environment 100 on which the calendar application according to the present system may be implemented. The computing system environment 100 is only one example of a suitable computing environment and is not intended to suggest any limitation as to the scope of use or functionality of the system. Neither should the computing environment 100 be interpreted as having any dependency or requirement relating to any one or combination of components illustrated in the exemplary operating environment 100.

The system is operational with numerous other general purpose or special purpose computing system environments or configurations. Examples of well known computing systems, environments, and/or configurations that may be suitable for use with the system include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices.

FIG. 1, an exemplary computing environment for implementing the present system, includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor 191, computer 110 may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The calendar application may be implemented on a client device or over a network. When implemented on a client device, the calendar application is provided by a calendar client application. The client application reads and writes calendar data from the client device memory. When implemented over a network, at least a portion of the user data for the calendar application may be stored on a remote server. In this case, the calendar application may be provided using a client application which accesses the remote server or through a browser application which accesses a web server providing a content page. In the case of a browser application, the content page provides the calendar interface. When provided over a network, the calendar application allows the user to schedule and share events with other users, view log-in status and other information for other users, and other information.

The calendar application of the present technology is discussed in more detail below. In particular, systems and methods associated with calendar application functionality and operation are discussed below with respect to FIGS. 2 through 6. Examples of calendar application interfaces are discussed below with respect to FIGS. 7 through 8.

Figure 2:
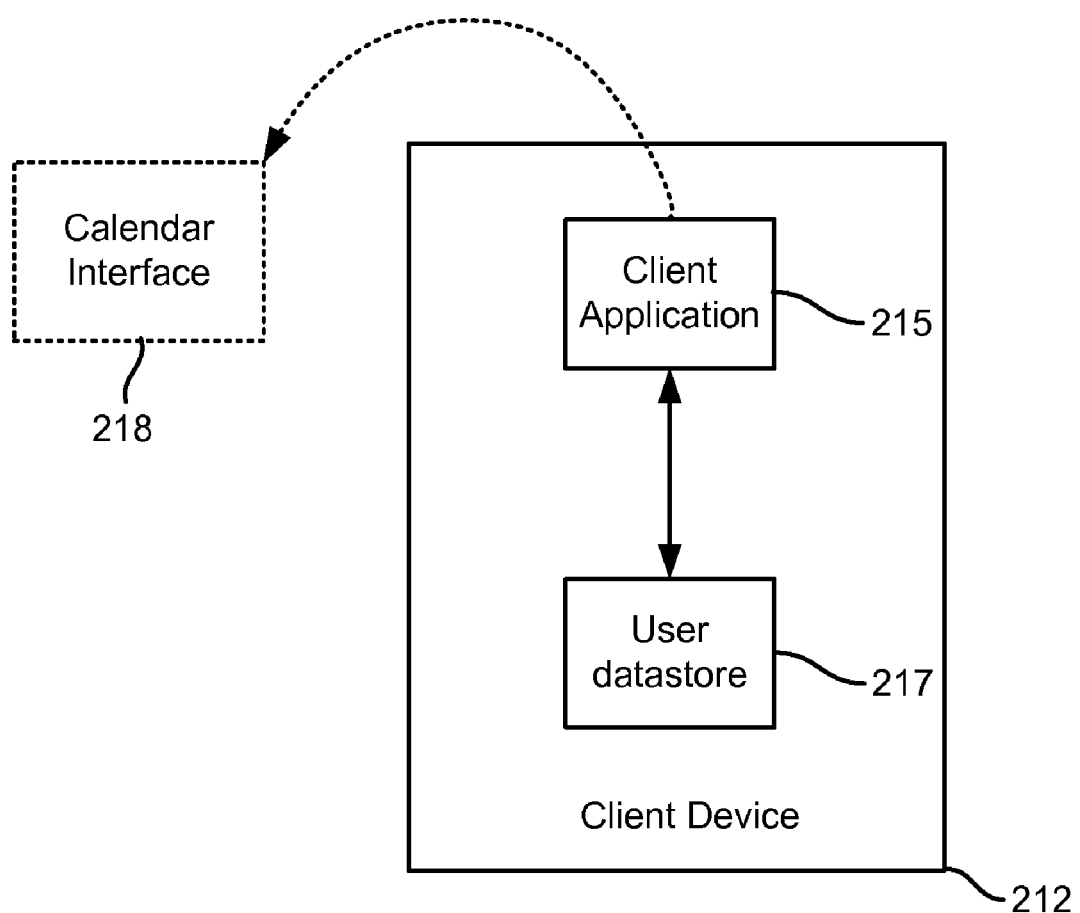
FIG. 2 illustrates a block diagram of an embodiment of a system for providing a calendar application by a client application.

FIG. 2 illustrates a block diagram of an embodiment of a system for providing a calendar application by a client application 215 and a user datastore 217. The client application 215 and datastore 217 may be implemented on a client device 212. Client device 212, as well as client device 220, network server 232 and/or user datastore 240 described hereinafter with respect to FIG. 2, may each be implemented by the computing environment 100 described above.

Client application 215 may communicate with user datastore 217 within client device 212. In one embodiment, client application 215 may be implemented as a calendar application, PIM application or some other application which allows a user to manage a calendar application. Client application 215 also provides calendar interface 218, as indicated by the dotted lines in FIG. 2. The calendar interface 218 is provided through a display device 191 (FIG. 1) associated with client device 212.

User datastore 217 includes user data associated with the calendar application. The user data may include the event object data associated with the user, user authentication information, calendar parameters configured by the user, and other data used to configure or populate a calendar interface or otherwise associated with the user. The user datastore 217 may also store special occasion information as explained hereinafter. In one embodiment, user datastore 217 may be implemented by the local memory of client device 212.

Figure 3:
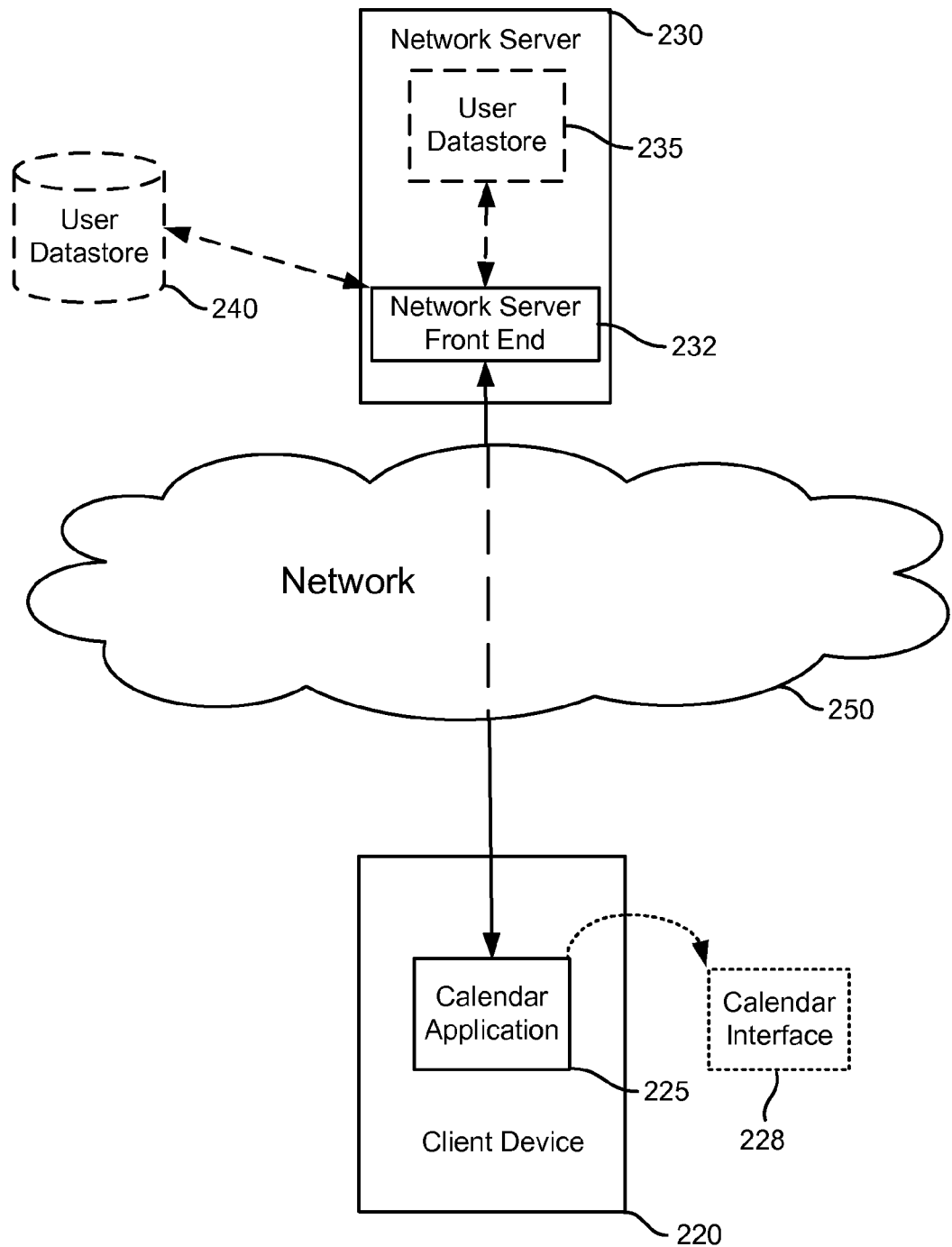
FIG. 3 illustrates a block diagram of an embodiment of a system for providing a calendar application by a browser application.

FIG. 3 illustrates a block diagram of an embodiment of a system for implementing a calendar application over a network. FIG. 3 includes client device 220, network server 230, and network 250. FIG. 3 may optionally include user datastore 240. Client device 220 may further include browser application 225. Browser application 225 communicates with network server 230 over network 250. In one embodiment, network 250 may be implemented as the Internet. Though the system of FIG. 3 includes a browser application on client device 220, other applications could be used to implement a calendar application and access user calendar data from a server over a network. Examples of other applications for implementing a calendar application include a PIM application, a client calendar application which accesses data over a network, and other applications.

Browser application 225 may communicate with network server 230 to retrieve and provide content pages. In one embodiment, browser application 225 may provide calendar interface 228 as a content page. In an embodiment wherein another type of application is used to provide a calendar application and access data from a server over network 250, the particular application would provide calendar interface 228.

Network server 230 includes network server front-end 232 and can optionally include user datastore 235. Network server front-end 232 receives and transmits messages from requesting client devices, such as client device 220. The received messages may include content requests, authentication requests, and other messages. The messages sent by network server front-end 232 may include content responses sent in response to a request, authentication responses, and other messages. Network server front-end 232 provides the calendar application functionality described herein. Operation of network server front-end 232 is discussed in more detail below.

Network server front-end 232 may also access user datastore 235. User datastore 235 is optional, as indicated by the dashed lines comprising user datastore 235 in FIG. 3. In one embodiment, network server front-end 232 may access remote user datastore 240. User datastore 240 is also optional, as indicated by the dashed lines comprising the datastore. In some embodiments, network server front-end 232 may access either or both datastores. Whichever datastore is used, user calendar data can be added, removed, changed and processed at each datastore. As discussed above, user calendar data (and/or user data) may include event object data, user authentication data, calendar parameter and settings data, and other user data associated with a calendar application. Datastores 235 and/or 240 may also include special occasion information as explained hereinafter.

Figure 4:
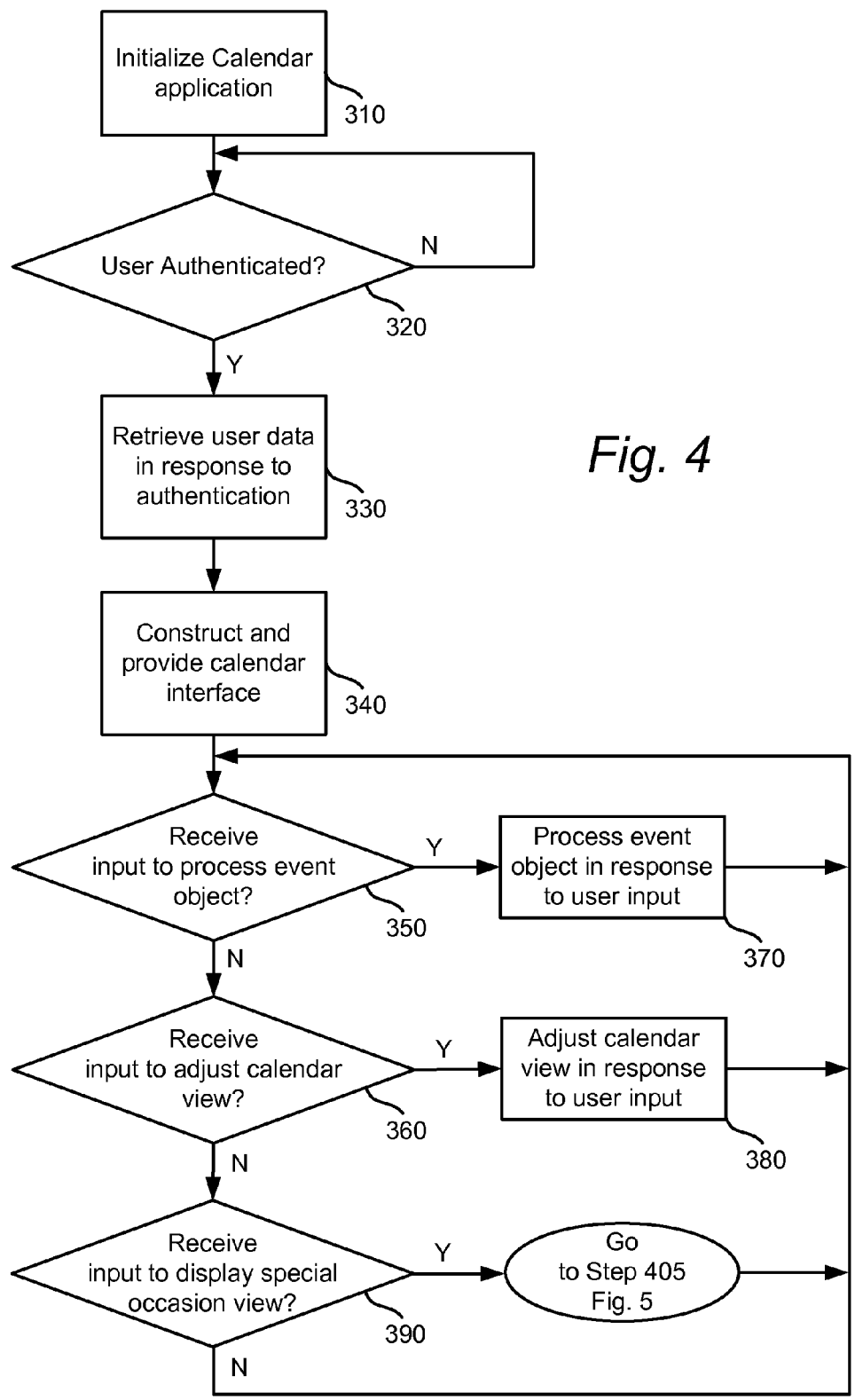
FIG. 4 illustrates a flowchart of an embodiment of a process for providing a calendar application.

FIG. 4 is a flowchart of an embodiment of a process for providing a calendar application according to the present system. The flowchart of FIG. 4 may be used to implement a calendar application locally on a client device as discussed with respect to client device 212 or with an application such as browser application 225 which accesses user data over a network.

First, a calendar application is initialized at step 310. Initializing a calendar application involves starting up the application which provides the calendar interface. If the application accesses data over a network, initializing the application may include detecting a network connection on the client device on which the application resides. Next, a determination is made as to whether a user is authenticated at step 320. In one embodiment, after initializing the calendar application at step 310, the calendar application will provide an authentication interface to a user. The authentication interface may allow a user to enter a user name, password, and/or other authentication information. Once a user name and password are received, the calendar application may confirm that the user name and password match information stored in the appropriate user datastore. If the user name and password information received from a user matches user and password information stored in a datastore, then the user is authenticated.

In the case of a locally implemented calendar application, the user name and password are compared with data stored in user datastore 217 on client device 212. If user data is accessed over network 250, the application determines if the received user name and password match user name and password information stored on user datastore 235 or user datastore 240. In this case, an authentication request is sent to network server 230 by client device 220. Network server front-end 232 receives the authentication request and sends an authentication request to user datastore 235 or user datastore 240. The appropriate user datastore receives the request, determines if the user name and password match user data stored in the user datastore, and provides an authentication response to network server front-end 232. The authentication response indicates whether the authentication was successful. Network server front-end 232 forwards the authentication response to the requesting client device 220.

If the user name and password information received from a user matches user and password information stored in a datastore, then the user is authenticated and the flowchart of FIG. 4 continues to step 330. If the user is not authenticated at step 320, the flowchart remains at step 320.

User data is retrieved in response to the authentication at step 330. In one embodiment, the user data retrieved can be associated with a default interface or the last calendar view provided in the calendar interface. The data may be retrieved from local datastore 217 or remote user datastore 235 or 240 depending on the implementation of the calendar application. In the case of a local datastore, client application 215 retrieves the user data from user datastore 217. When accessed from local user datastore 217, the user data may include a series of files. Each file may include data associated with an event object for a user. For example, an event object may include data for a dinner appointment, a sporting event, a wedding, or some other event associated with the user. An event object may further include a special occasion designation and a significance weighting in accordance with the present system as explained hereinafter.

User data may also be retrieved from remote datastores 235 and/or 240. In the case of a network-based calendar application, browser application 225 may request the user data from network server 230. Network server 230, or network server front-end 232, may process the request similar to the authentication request discussed above. However, instead of comparing received user authentication information to stored user authentication information, the appropriate user datastore retrieves requested user data and places the data in a response. The response is then sent to network server front-end 232, which receives the response and sends it to the requesting application.

After user data has been retrieved, the calendar application interface is constructed and provided at step 340. In one embodiment, the calendar application interface is constructed and populated with the retrieved data. The constructed interface may be a default calendar interface or the last interface accessed by the user. Once the interface is constructed, the event objects associated with the user are populated within the interface.

After constructing and providing the calendar application interface, a determination is made as to whether input is received to process event objects at step 350. In one embodiment, receiving input to process an event object includes receiving input to add, change or delete an event object, or to designate an event object as a special occasion and assign it a significance weighting per the present system. If input is received to process an event object at step 315, the flowchart of FIG. 4 continues to step 370. Event objects are processed in response to user input at step 370. Processing the event object may include adding, removing or changing the appropriate event object and updating the calendar application interface in response to processing the object. Processing the event object at step 370 is discussed in more detail below with respect to FIG. 5. After the event object is processed, the flowchart of FIG. 4 returns to step 350. If input is not received to process an event object at step 350, the flowchart of FIG. 4 continues to step 360.

A determination is made as to whether input is received to adjust a calendar view at step 360. Receiving input to adjust a calendar view may be associated with changing the actual calendar view or calendar view parameters. Changing the actual view may include providing a daily, weekly, monthly or other calendar view within the calendar interface. If input is received to adjust a calendar view, the flowchart of FIG. 4 continues to step 380 where the calendar view is adjusted in response to the user input. Adjusting the calendar view in response to user input is discussed in more detail below with respect to FIG. 6. After the calendar view is adjusted, the flowchart of FIG. 4 continues to step 350. If no input is received to adjust a calendar view at step 360, the flowchart of FIG. 4 continues to step 390 as explained hereinafter.

Figure 5:
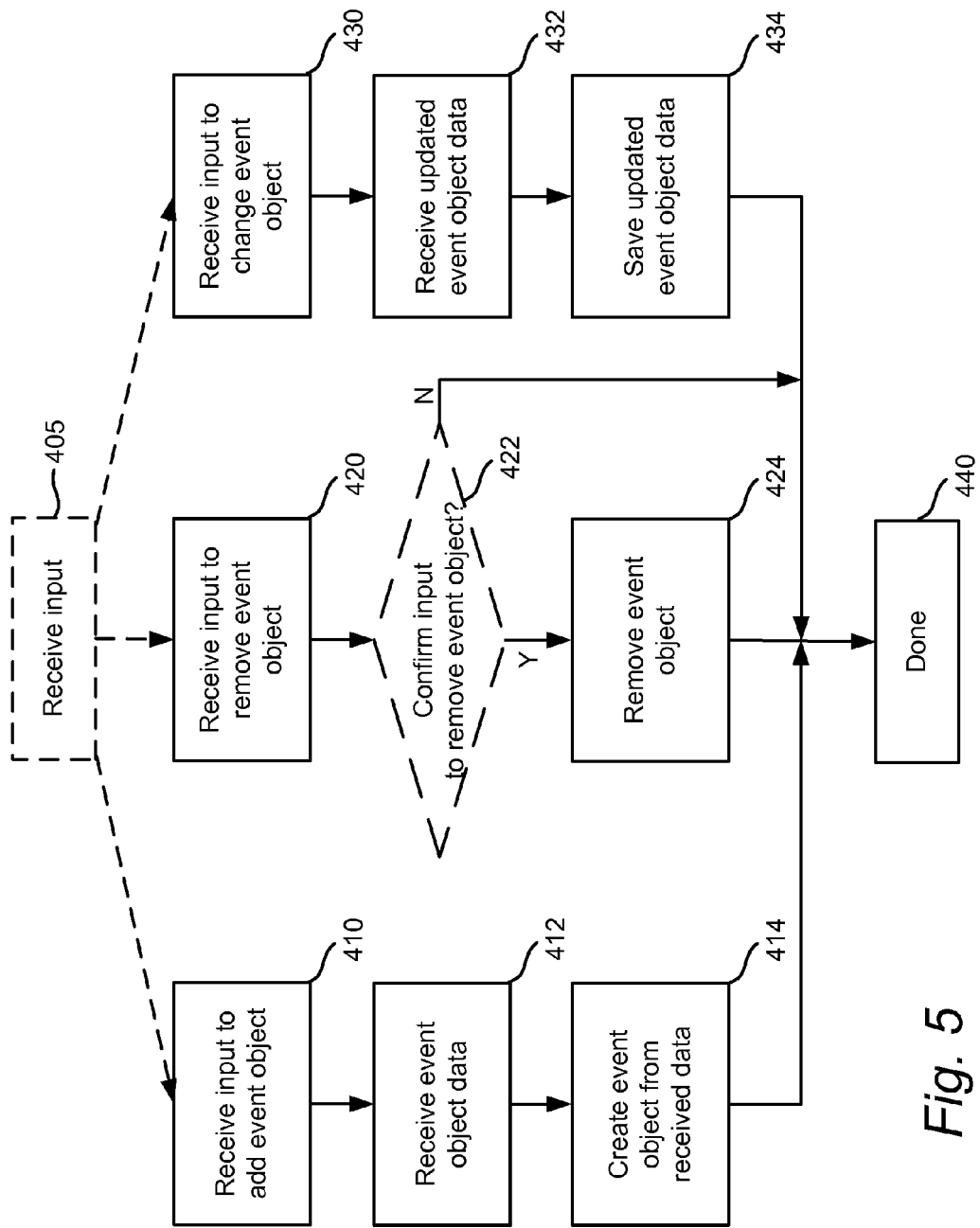
FIG. 5 illustrates a flowchart of an embodiment of a process for processing an event object.

Event objects provided within a calendar interface may be configured in response to user input. FIG. 5 is a flowchart of an embodiment of a process for processing an event object. In one embodiment, the flowchart of FIG. 5 provides more detail of step 370 of FIG. 4 discussed above. Several types of input may be received from a user through a calendar interface. Types of input that may be received include input to add event object data, remove event object data, and change event object data. The input can be received through a drop down menu, command line, selection of an icon or other element of an interface, or in some other manner. Input received to add an event object, remove an event object, and change an event object are discussed below with respect to steps 410, 420 and 430, respectively, of the flowchart of FIG. 5.

Input may be received to add an event object at step 410. In one embodiment, input to add an event object may be received through a calendar interface as a selection of a particular time slot or block within a calendar interface, a selection of an element within a drop down menu, a selection of an icon, or some other input.

Next, the event object data is received at step 412. The event object data is received from a user. In one embodiment, receiving the event object data may include providing an interface in response to the input received at step 410. The interface may allow a user to input data associated with the event object. For example, the interface may allow a user to select a category for an event object. Exemplary event object categories may include a dinner appointment, a sporting event, a party and other events. The interface may then allow a user to enter meta-data regarding the event object into the interface. The meta-data may include general data and/or data tailored to the particular event. For example, for a dinner event, the entered meta-data may include a name for the event, name of the restaurant, location of the restaurant, a name under which a dinner reservation is made and other information.

As explained hereinafter, a special occasion interface may be presented to a user allowing a user to create special occasion events, and assign a significance weighting to the event. In addition to creating such special occasion event objects from the special occasion interface, a user may also create such event objects in step 412. In particular, one of the event categories mentioned above may be to designate the event as a special occasion. Designating an event as a special occasion means that the event object will be displayed on the special occasion interface when that interface is selected as explained hereinafter. Upon designating an event object as a special occasion event object, the user may also enter meta-data indicating a significance weighting of the special occasion event object.

In one embodiment, the meta-data indication of significance weighting may simply be a binary designation of either more significant or less significant. In a further embodiment, the meta-data indication may be a weighing on a normalized scale (e.g., out of 10 or out of 100) where the user can assign an importance on a sliding scale. As described hereinafter, special occasion event objects assigned a sliding scale significance weighting will appear at different locations along a Y-axis displayed on the special occasion interface. As explained hereinafter, a user may add a wide-variety of other meta-data that is stored in association with a special occasion event object.

After the event object data is received, an event object is created from the received data at step 414. In the case of a calendar application implemented entirely on client device 212, the event object data is saved by client application 215 to user datastore 217. After the data is stored to user datastore 217, an event object may be provided in the current calendar interface, if appropriate. For example, the event object will be displayed in the calendar interface if the event object corresponds to a time currently provided in the calendar interface view. This is true for both special occasion event objects and event objects which are not designated as special occasion event objects.

For a calendar application in which the event object is saved remotely, creating the event object from the received data includes storing the event object data on a datastore associated with a network server. With respect to FIG. 3, browser application 225 will send the event object data in a write message to network server 230. Network server front-end 232 receives the write message and forwards the write message to either user datastore 235 or user datastore 240. In one embodiment, when stored at a remote datastore, the user event object data is stored in a table format. The table may include user identification information and event object data associated with the user identification information. After receiving a confirmation that the data is stored on the appropriate datastore, network server front-end 232 sends a confirmation to browser application 225 that the event object data has been stored. In addition to sending the event object data to a remote datastore, browser application 225 can provide the received event object data in the current interface if the event object data is associated with a time included in the current calendar view. After the event object is created from the received data at step 414, the flowchart of FIG. 5 ends at step 440.

Input may be received to remove an event object at step 420. The input may be received as a selection from a drop down menu associated with the event object, selection of an icon or some other input within the calendar interface. A determination is then made as to whether a user has confirmed to remove the event object at step 422. Step 422 can be optionally performed to confirm that the event object should be removed from the calendar interface and appropriate user datastore. In one embodiment, step 422 includes providing a user prompt inquiring whether the user wishes to remove the object data, as well as buttons for removing or not removing the object. User selection of one of the buttons satisfies the determination as to whether the user confirms removal of the event object. If confirmation input is received that the event object should be removed, the flowchart of FIG. 5 continues to step 424. If input indicates that the event object should not be removed (or no input is received at all), the flowchart of FIG. 5 ends at step 440.

At step 424, the event object is removed. Removing the event object may include removing the actual object data from the calendar interface and deleting the data from the appropriate datastore. In the case of a calendar application implemented entirely on a client device, client application 215 sends a message to user datastore 217 to remove the event object. In the case of a calendar application implemented using a remote datastore, browser application 225 sends a message to network server 230 to remove the particular user event object data from user datastore 235 or user datastore 240. In this case, network server front-end 232 receives the user request information and processes the user request by sending a message to user datastore 235 or user datastore 240. Network server front-end 232 receives a confirmation message from the appropriate datastore once the event object data is removed from the appropriate datastore, and forwards the confirmation message to browser application 225. The flowchart of FIG. 5 then continues to step 440 where the flowchart ends.

Input may be received to change an event object at step 430. Input may be received to change an event object by user selection of an existing object in a calendar interface. The input may select the event object and then an entry within a drop down menu associated with the event object, a double-click of the object or some other input. Next, updated event object data is received at step 432. Similar to step 412 discussed above, the updated event object data may be received through an interface provided in response to selection of the event object. In one embodiment, updating event object data may include changing existing data, adding missing data, or removing existing data in the interface. Updating an event object may also be to convert an event object to a special occasion event object, or visa-versa, as well as changing the significance weighting or other meta-data associated with a special occasion event object.

After the updated event object data is received at step 432, the updated event object data is saved at step 434. Similar to step 414 discussed above, saving updated event object data may include storing the object data on a local or remote datastore. In addition to saving the event object data, the updated event object data is provided in the appropriate calendar interface view. The flowchart of FIG. 5 then ends at step 440.

Figure 6:
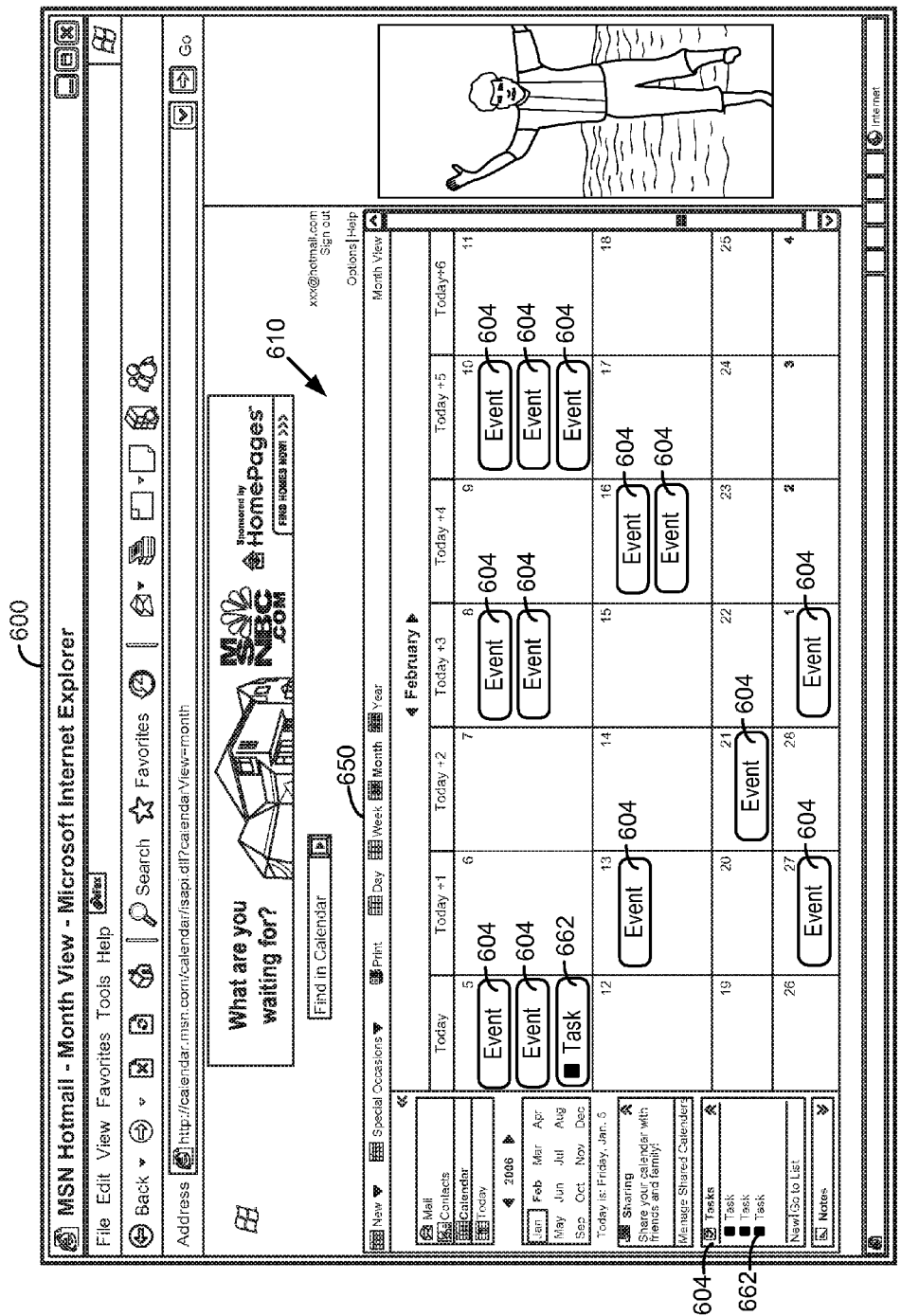
FIG. 6 is an example of a calendar application interface according to the present system.

FIG. 6 displays an example of a display 600 including a calendar interface 610. Interface 610 includes a tool bar 650 having several buttons allowing a user to configure interface 610 and event objects within interface 610. In particular, tool bar 650 includes buttons associated with a "new" calendar object, "special occasions" view and "print" view. Toolbar 650 may further include a list of user selectable views. Toolbar 650 includes a day view, week view, month view and year view. Other options may be provided on tool bar 650 in further embodiments.

The "new" button allows a user to generate new event objects. Generation of a new event object is discussed in more detail above with respect to the flowchart of FIG. 5. The "print" view button allows a user to view an image of the calendar as it will appear when printed. The toolbar 650 may also present the user with the option to display a day, week, month, year or other time period.

Figure 7:
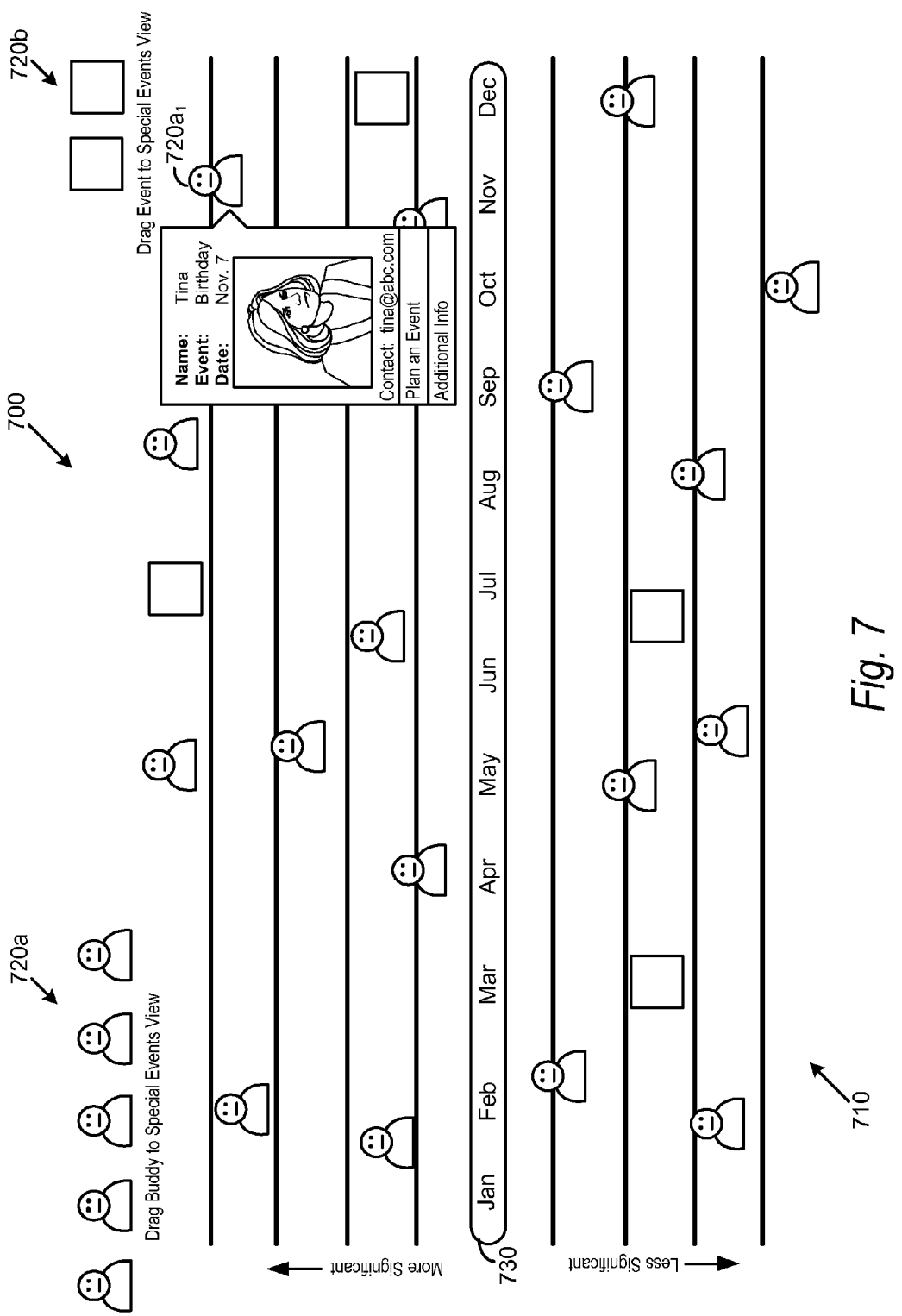
FIG. 7 is an example of a special occasion interface according to the present system including a highlighted personal event object.

In accordance with the present system, tool bar 650 may further include a "special occasion" option. Selection of the "special occasion" generates a display of a special occasion interface 700 as shown in FIG. 7. Special occasion interface 700 may be used to present a high level view of all significant events over a given time period. The time period shown in FIG. 7 is over the course of a year, but it is understood that the time period may be shorter or longer than that in alternative embodiments. Moreover, while the year shown in FIG. 7 begins with January, it is understood that the time period may begin with the current month, or one or more months prior to the current month.

Special occasion interface 700 includes a plurality of special occasion event objects 720 which can be dragged and positioned on a grid 710 to represent special occasions of emotional or other significance to the user. Special occasion event objects 720 include personal event objects 720a used to represent special occasions for people, such as birthdays, anniversaries, etc., and special occasion event objects 720 also include event objects 720b used to represent festivities not associated with particular people, such as for example holidays. As used herein, a festivity event object 720b need not relate to only festive or happy events, but may be any event not otherwise defined as a personal event object 720a. Prior to being assigned to particular a person or festivity, objects 720a and 720b may be unassigned and positioned above the grid 710 as shown. In embodiments, personal event objects 720a may be represented by avitars or other graphical objects, and festivity event objects 720b may be represented by a box or other graphical objects.

Figure 8:
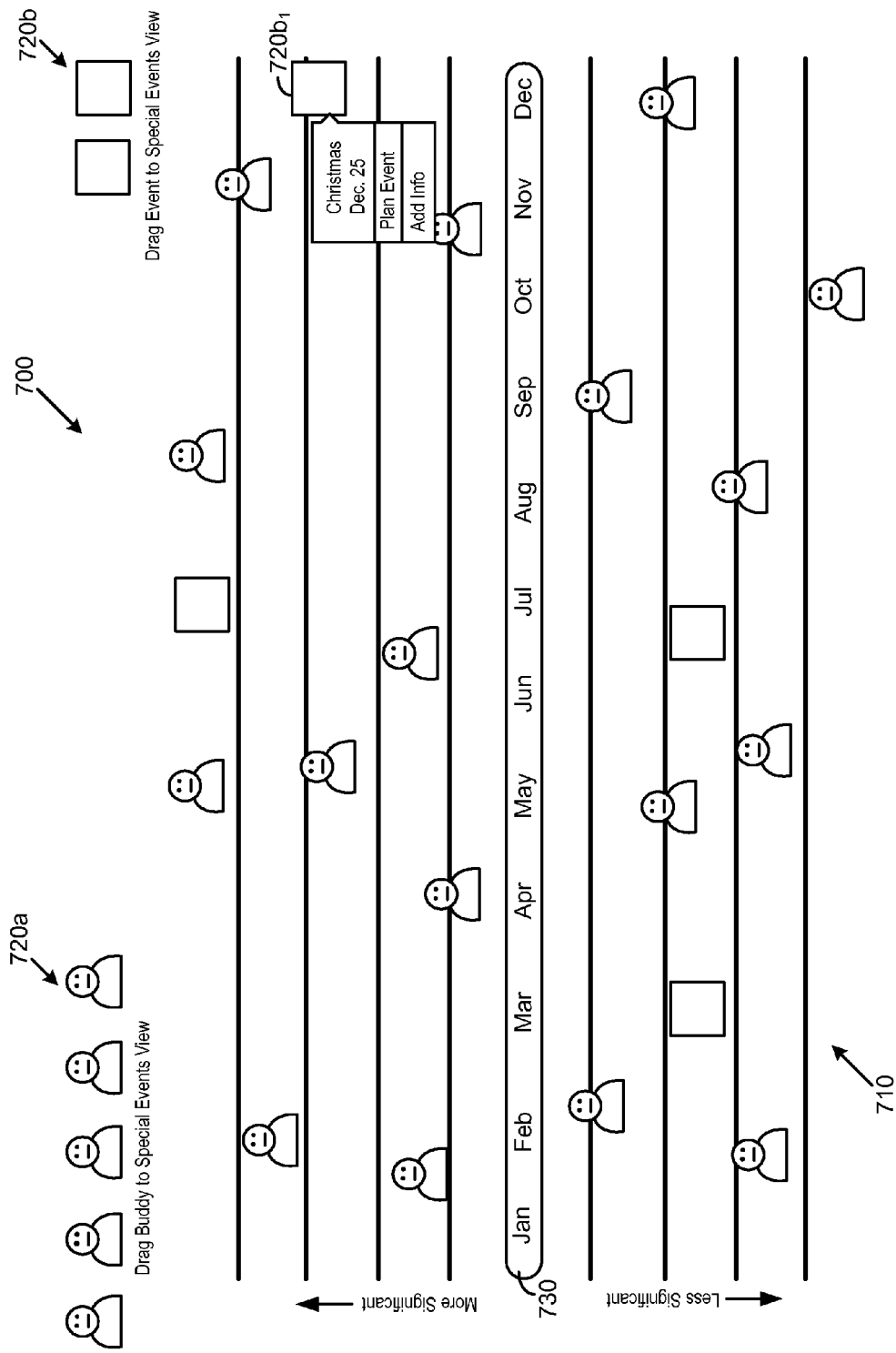
FIG. 8 is an example of a special occasion interface according to the present system including a highlighted festivity event object.
Figure 9:
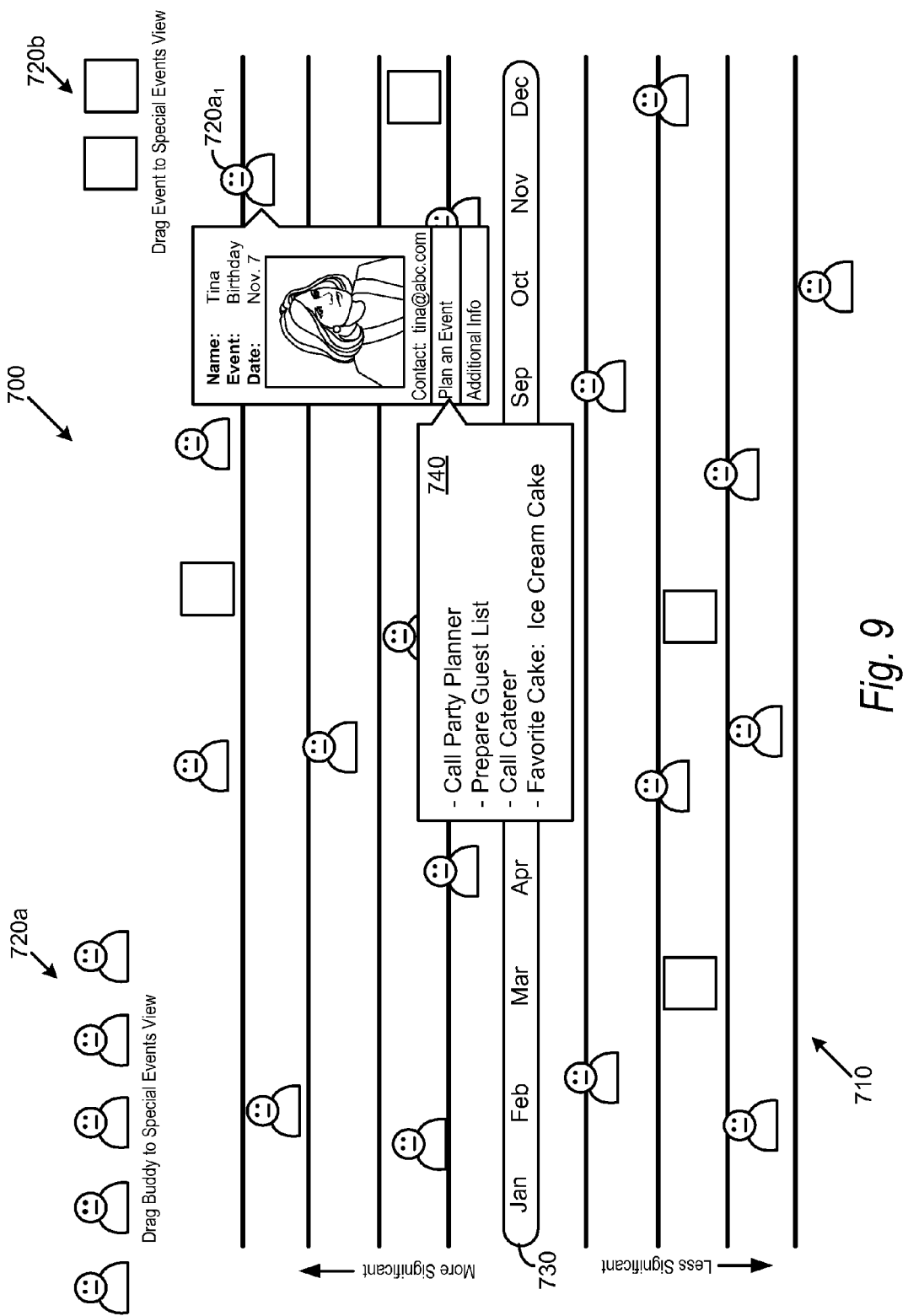
FIG. 9 is an example of a special occasion interface according to the present system including a highlighted personal event object and an interface for adding planning details for the personal event object.
Figure 10:
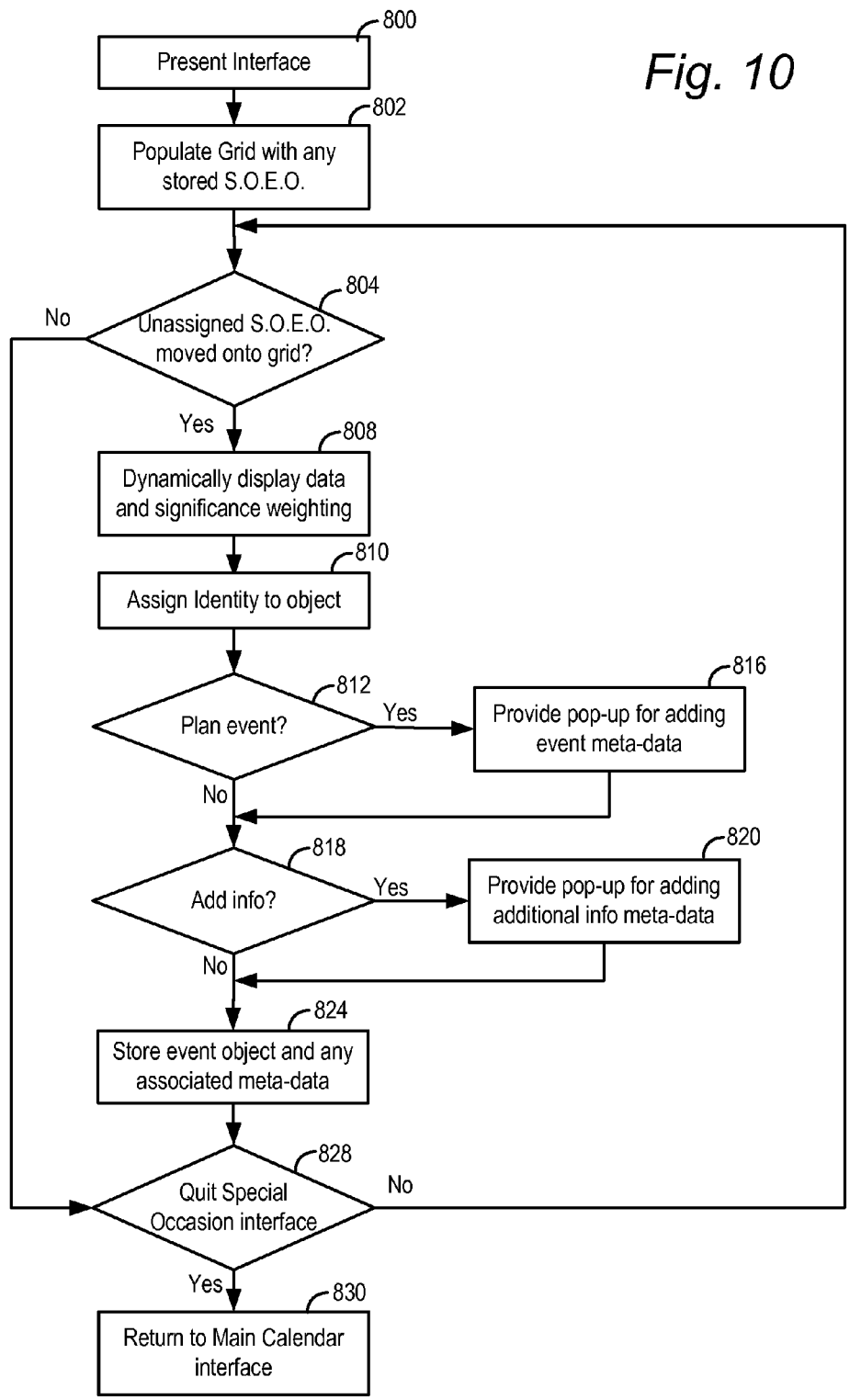
FIG. 10 illustrates a flowchart for the operation of creating special occasion event objects via the special occasion interface according to the present system.

Referring now to the interface of FIGS. 7-9 and the flowchart of FIG. 10, in operation, once a user selects the special occasion interface 700, the interface is presented to the user in step 800, and grid 710 is populated with any stored special occasion event objects (S.O.E.O.) 720 in step 802. These stored events may come from prior use of the special occasion interface 700. Alternatively, as explained above with respect to step 412 in FIG. 5, an event may be defined as a special event without using interface 700.

In embodiments, objects 720 may be positioned at a given x, y coordinate on grid 710 based on the date of the event and the defined significance weighting associated with a given object 720. In particular, the date assigned to an event object 720 may determine its location along the x-axis of grid 710 (i.e., along date bar 730), and the significance weighting may determine its location along the y-axis of grid 710 (i.e., perpendicular to date bar 730). The x and y axes may be reversed in alternative embodiments.

In embodiments, the higher the significance weighting, the more important the occasion is to the user and the higher it is placed on the grid 710. In an alternative embodiment mentioned above, the significance weighting may be binary, with a user designating a special occasion event object 720 as either more significant or less significant. Those objects 720 designated as more significant may be placed above the date bar 730, and those which are less significant, below the date bar 730. In further embodiments, there may greater than two significance weightings available, such as for example three groups, four groups, etc.

The significance weighting of an object 720 may be manually set based on its being manually positioned along the y-axis. In an alternative embodiment, at least a default location for an object 720 along the y-axis may be automatically set. As explained below, in embodiments, an unassigned object 720 may be assigned an identity prior to it being placed on the grid 710. In such an embodiment, the calendar application may calculate a default significance weighting based on information stored in the user's contacts relating to the person (for personal event objects 720a) or festivity (for festivity event objects 720b). For example, the calendar application may be able to determine a default significance weighting for a personal event object based on the proximity of the user and assigned contact, number of friends in common, how long the user and contact have known each other and level of communication between the user and contact. Additional and/or alternative criteria may be used to automatically determine a default significance weighting for a created special occasion event object 720.

Once the grid 710 is populated with existing special occasion event objects 720, the application program checks for the addition of new objects 720 in step 804. If none are detected, and instead the user elects to quit the interface (step 828), the interface 700 is closed and the user returns to the main calendar interface shown in FIG. 6 (step 830). Alternatively, a user may create a new special occasion event object 720 by adding a new object 720 to the grid 710 in step 804. This is accomplished by selecting an unassigned object (either a personal event object 720a or a festivity 720b) using the mouse or other selection device and moving the object 720 onto the grid 710. In embodiments, the date (along the x-axis) and significance weighting (along the y-axis) may be dynamically displayed next to the object as it is moved over the grid in step 808. The dynamic display of the date and/or significance weighting may be omitted in alternative embodiments.

Once the object 720 is positioned at the desired date and with the desired significance weighting, the user may assign an identity to the object 720 in step 810. A user may assign an identity to an object in a number of ways. Where object 720 is a personal event object, the user may for example double click on the selected object and be presented with a pop-up window or other interface allowing the user to add meta-data relating to the person's name, possibly a graphic or photo and the type of event it is. Alternatively, the user may be given the option to link the selected object 720 to a contact stored in the user's local or on-line address book. For example, in FIG. 7, the user has selected an unassigned personal event object 720a, and moved it to November $7^{th}$ with a relatively high importance on the grid 710. The user has then assigned Tina's identity and contact information to the object 720a₁ (either manually or by linking it to a stored contact for Tina). The user has also defined that the object 720a₁ represents Tina's birthday.

It is understood that an identity may be assigned to an object 720a before it is positioned on the grid 710. In such embodiments, the user may assign the information in step 804 described above and then position the object 720a as desired. When using a stored contact for assigning an identity to an object, the contact's birthday may be known. Accordingly, in an embodiment where identity is assigned prior to positioning on the grid, the object may automatically be positioned at a default location along the x-axis at the contact's birthday. Once an object 720a is assigned an identity, the identity may be displayed when the user hovers over the object 720a alongside the avatar for that object, as shown in FIG. 7. Alternatively, upon hovering over the object 720a, the avatar may be replaced by the assigned identity.

A festivity event object 720b may be added to the special occasion interface 700 in a similar manner. For example, as shown in FIG. 8, a user may select an unassigned object 720b₁, position it on the grid 710 at the desired position, and then assign it an identity. In the example of FIG. 8, the user has created an object 720b₁ for Christmas. As above, the user may assign an identity to a festivity event object 720b prior to positioning it on the grid 710. Depending on the festivity, the calendar application may automatically position the object 720b at a default location along the x-axis. For example, where the user defines an object 720b for Christmas, the calendar application may automatically position the object at December 25.

Referring now to step 812 and FIG. 9, the user may also have the option to plan an event associated with the special occasion event object 720. In particular, the displayed contact information for an object 720 may include an option for planning events. Upon selecting that option, the user may be presented with a pop-up window or other interface 740 allowing the user to enter meta-data regarding planning for an event in step 816 and as shown in FIG. 9. Similarly, in step 818, the user may be presented with an option to add additional information for an object 720. In particular, the displayed contact information for an object 720 may include an option for adding additional information, which may be any of various notes, tasks or links to other stored information. Upon selecting that option, the user may be presented with a pop-up window or other interface (similar to interface 740 for planning an event) allowing the user to enter additional meta-data regarding an event in step 820.

Once a special occasion event object 720 is created as described above, it may be stored in step 824. The event object 720 may be stored along with any meta-data defined or added including for example significance weighting, contact information and any event plans and additional details. If the contact information is manually entered, the system may prompt the user to create or update a stored contact for the user in the user's contacts. Although not shown, it is appreciated that a user may edit a stored event object 720 by selecting it on the grid and then changing the information. A user may completely alter the identity of a stored object 720 to a new person or festivity. A user may also be given the option to delete a previously stored special occasion event object 720.

After an object 720 is created and stored, the user may elect to quit the special occasion interface 700 in step 828. If so, the calendar application returns the user to the main calendar application interface (FIG. 6) in step 830. Otherwise, the program may return to step 804 to create additional special occasion event objects.

By using special occasion interface 700, a user may quickly and easily get an overview of all significant occasions the user has in the coming weeks, months, year or other time period. Thus, as opposed to the conventional 5 day reminder provided on conventional calendar applications, a user may know at a glance and far in advance what special occasions are coming up and have plenty of time to plan for them. As another advantage, as opposed to buying cards, presents and/or performing other tasks on a "one-off" basis for each special occasion, the special occasion interface 700 makes it easy for the user to buy cards, presents and/or perform multiple tasks for some or all of the special occasions all at once, thereby saving time and providing economies of scale.

Figure 11:
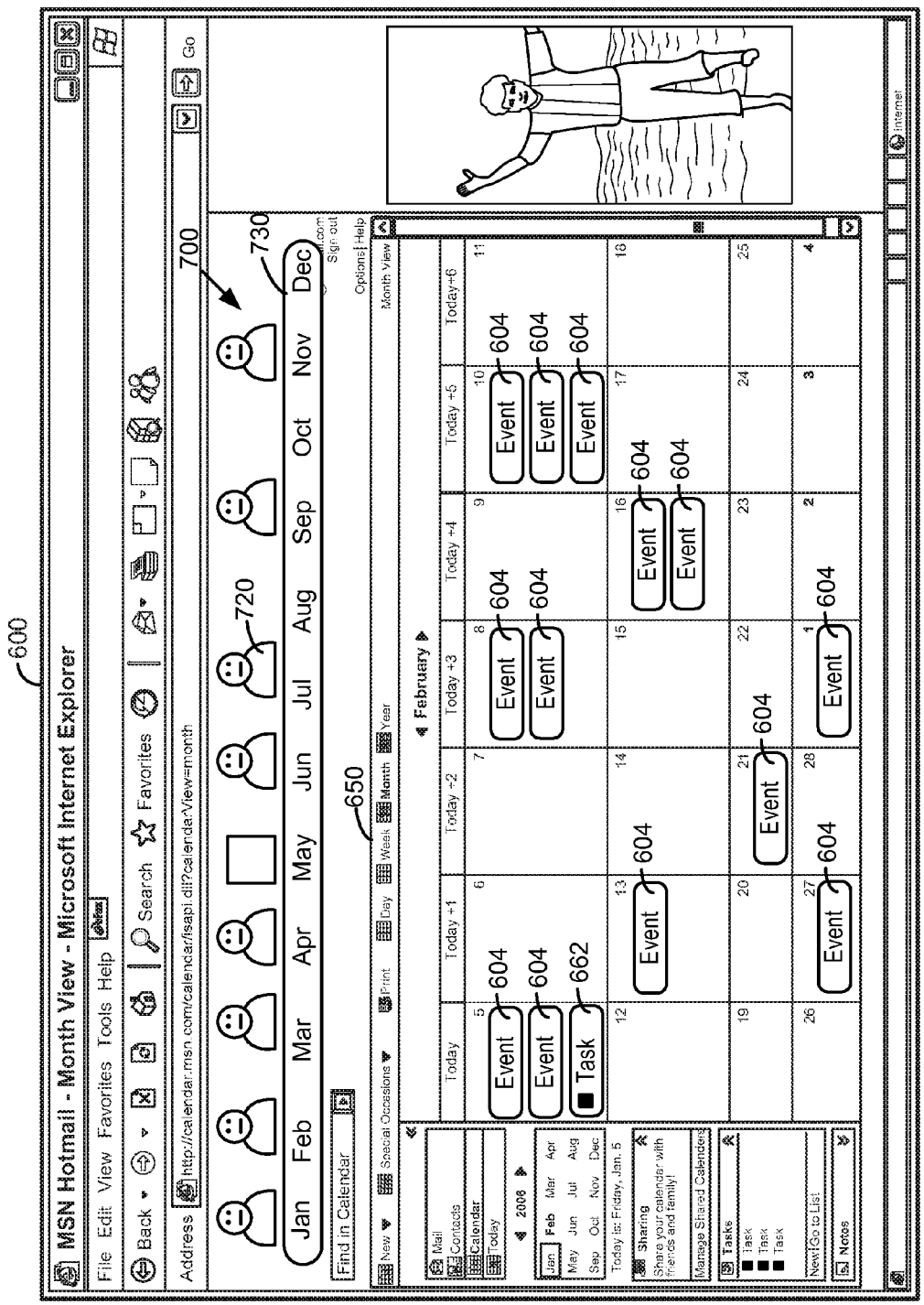
FIG. 11 is an example of a calendar application interface on which is displayed a special occasion interface according to the present system.

Referring now to FIG. 11, it is further contemplated that the user may be given the option to display some form of the special occasion interface 700 on the main calendar interface 600. For example, the interface 700 including one or more objects 720 (personal event objects 720a and/or festivity event objects 720b) and the time bar 730 may be displayed to give the user a high level view of the special occasions coming up in the near and distant future. A user may be shown details, and may add, edit or delete details, by selecting an object 720 from the special occasion interface 700 shown in FIG. 11.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method of displaying stored events, comprising the steps of:
    (a) displaying a general calendar interface populated with at least first and second events;
    (b) providing a selectable option on the calendar interface, selection of the option switching a view from the general calendar interface to a special occasion calendar interface;
    (c) displaying the special occasion calendar interface upon selection of the selectable option, the special occasion calendar interface having two axes, a first axis of the two axes representing when events placed on the special occasion calendar interface occur, and a second axis of the two axes representing a relative importance of events placed on the special occasion calendar interface;
    (d) receiving selection of the first event, and not the second event, displayed on the general calendar for placement of the first event on the special occasion calendar interface, selection of the first event and not the second event for placement on the special occasion calendar interface indicating that the first event has greater significance, from the user's perspective, than a second event;
    (e) receiving selection of a graphical object displayed on the special occasion calendar interface to represent the first event on the special occasion calendar interface;
    (f) receiving a placement of graphical object by the user at a position on the special occasion calendar interface along the first axis and along the second axis, the user able to place the graphical object at locations along the first axis to represent when the first event takes place, and the user able to place the graphical object at locations along the second axis to represent an importance of the first event to the user on a sliding scale of least important to most important; and (g) displaying the graphical object at the position received in said step (f).

2. A method as recited in claim 1, further comprising the step of receiving an assignment of contact information to the graphical object for which selection was received in said step (e), the contact information selected from contact information in the user's stored contacts.

3. A method as recited in claim 2, wherein said step of receiving assignment of contact information comprises the step of receiving assignment of an identity of a person to the graphical object.

4. A method as recited in claim 1, wherein step (f) of receiving placement of the graphical object at locations along the second axis comprising the step of receiving placement at any location along the second axis to represent an importance of the event to the user on a continuous sliding scale of least important to most important.

5. A method as recited in claim 1, further comprising the step (h) of receiving additional information relating to planning the one or more events in the first group.

6. A method as recited in claim 1, wherein step (c) of displaying the special occasion calendar interface comprises the step of displaying events occurring within a twelve month period.

7. A method as recited in claim 1, wherein the first event is a personal event including birthdays and anniversaries.

8. A method as recited in claim 1, wherein the first event is a festivity event including holidays.

9. A computer implemented method of displaying stored events, comprising the steps of:

(a) displaying a general calendar interface populated with a user's events;
(b) providing a first selectable option on the calendar interface, selection of the first option switching a view from the general calendar interface to a special occasion calendar interface;
(c) displaying the special occasion calendar interface upon selection of the selectable option, the special occasion calendar interface having two axes, a first axis of the two axes representing when events placed on the special occasion calendar interface occur, and a second axis of the two axes representing a relative importance of events placed on the special occasion calendar interface;
(d) receiving selection of an event displayed on the general calendar for placement of the event on the special occasion calendar interface;
(e) receiving selection of a graphical object displayed on the special occasion calendar interface to represent the event on the special occasion calendar interface;
(f) receiving a placement of graphical object by the user at a position on the special occasion calendar interface along the first axis and along the second axis, the user able to place the graphical object at locations along the first axis to represent when the event takes place, and the user able to place the graphical object at locations along the second axis to represent an importance of the event to the user on a sliding scale of least important to most important; and
(g) displaying the graphical object at the position received in said step (f).

10. A method as recited in claim 9, wherein said step of receiving a placement comprises the step of receiving information manually entered by the user.

11. A method as recited in claim 9, wherein said step of receiving a placement comprises the step of receiving stored information relating to the event.

* * * * *